(12) United States Patent
Lee et al.

(10) Patent No.: US 10,091,503 B2
(45) Date of Patent: *Oct. 2, 2018

(54) METHOD AND APPARATUS FOR ENCODING/DECODING INTRA PREDICTION MODE

(71) Applicant: ELECTRONICS AND TELECOMMUNICATIONS RESEARCH INSTITUTE, Daejeon (KR)

(72) Inventors: Jin Ho Lee, Daejeon (KR); Hui Yong Kim, Daejeon (KR); Sung Chang Lim, Daejeon (KR); Jin Soo Choi, Daejeon (KR); Jin Woong Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 129 days.

This patent is subject to a terminal disclaimer.

(21) Appl. No.: 15/201,811

(22) Filed: Jul. 5, 2016

(65) Prior Publication Data

US 2016/0316201 A1 Oct. 27, 2016

Related U.S. Application Data

(63) Continuation of application No. 14/346,756, filed as application No. PCT/KR2012/007255 on Sep. 10, 2012, now Pat. No. 9,432,675.

(30) Foreign Application Priority Data

Sep. 28, 2011 (KR) .................. 10-2011-0098602
Nov. 7, 2011 (KR) .................. 10-2011-0114882

(51) Int. Cl.
*H04N 19/11* (2014.01)
*H04N 19/176* (2014.01)
(Continued)

(52) U.S. Cl.
CPC .......... *H04N 19/11* (2014.11); *H04N 19/107* (2014.11); *H04N 19/176* (2014.11);
(Continued)

(58) Field of Classification Search
CPC .... H04N 19/176; H04N 19/593; H04N 19/11; H04N 19/44; H04N 19/107
See application file for complete search history.

(56) References Cited

U.S. PATENT DOCUMENTS

| | | | |
|---|---|---|---|
| 2004/0008771 A1 | 1/2004 | Karczewicz | |
| 2010/0208802 A1 | 8/2010 | Tsukuba et al. | |
| 2011/0280304 A1* | 11/2011 | Jeon ................. | H04N 19/105 375/240.12 |

FOREIGN PATENT DOCUMENTS

| | | |
|---|---|---|
| JP | 2005-529527 A | 9/2005 |
| JP | 2006-5438 A | 1/2006 |
| KR | 2007-0005848 A | 1/2007 |

OTHER PUBLICATIONS

Jinho Lee et al., "Intra-mixture Prediction Mode and Enhanced Most Probable Mode Estimation for Intra Coding in H.264/AVC", INC, IMS and IDC, 2009. NCM '09. Fifth International Joint Conference on, vol., No., doi: 10.1009/NCM.2009.105.
(Continued)

*Primary Examiner* — Utpal Shah
(74) *Attorney, Agent, or Firm* — NSIP Law

(57) ABSTRACT

An image decoding method, according to the present invention, includes the steps of: deriving an MPM candidate mode from neighboring blocks adjacent to a target block to be decoded; generating an MPM list using the MPM candidate mode derived from the neighboring blocks; and deriving an
(Continued)

intra prediction mode for the target block to be decoded using the generated MPM list. According to the present invention, image compression efficiency can be improved.

6 Claims, 8 Drawing Sheets

(51) Int. Cl.
    *H04N 19/107*     (2014.01)
    *H04N 19/184*     (2014.01)
    *H04N 19/44*     (2014.01)
    *H04N 19/91*     (2014.01)

(52) U.S. Cl.
    CPC ........... *H04N 19/184* (2014.11); *H04N 19/44* (2014.11); *H04N 19/91* (2014.11)

(56) References Cited

OTHER PUBLICATIONS

International Search Report dated Feb. 13, 2013 in corresponding International Patent Application No. PCT/KR2012/007255 (3 pages, in Korean).

\* cited by examiner

METHOD AND APPARATUS FOR ENCODING/DECODING INTRA PREDICTION MODE

CROSS-REFERENCE TO RELATED APPLICATIONS

This application is a continuation of U.S. patent application Ser. No. 14/346,756 having a 371 (c) date of Mar. 24, 2014, now U. S. Pat. No. 9,432 675, issued Aug. 30, 2016 which is a U.S. national stage application of International Application No. PCT/KR2012/007255, filed on Sep. 10, 2012, which claims to the benefit of Korean Patent Applications No. 10-2011-0098602, filed on Sep. 28, 2011 and Korean Patent Applications No. 10-2011-0114882, filed on Nov. 7, 2011, in the Korean Intellectual Property Office, the entire disclosures of each of which are incorporated herein by reference for all purposes.

TECHNICAL FIELD

The present invention relates to image processing, and more specifically to an intra prediction mode encoding/decoding method and apparatus.

BACKGROUND ART

Recently, HD (High Definition) resolution broadcast services are spreading nationwide and worldwide, and many uses are familiar with high-resolution, high-quality images. Accordingly, many organizations put more energy on development of next-generation imaging apparatuses. Further, more interest is drawn to UHD (Ultra High Definition) that provides four times or more higher resolution than that of HDTV as well as HDTV, and thus, an compression technology is required for higher-resolution, higher-quality images.

For image compression, there may be used an inter prediction technology that predicts a pixel value included in a current picture from pictures that temporally come earlier and/or later than the current picture, an intra prediction technology that predicts a pixel value included in a current picture using pixel information in the current picture, and entropy encoding technology that allocates a shorter code to a symbol appearing more frequently and a longer code to a symbol appearing less frequently.

DISCLOSURE

Technical Problem

An object of the present invention is to provide an image encoding method and apparatus that may enhance image compression efficiency.

Another object of the present invention is to provide an image decoding method and apparatus that may enhance image compression efficiency.

Still another object of the present invention is to an intra prediction mode encoding method and apparatus that may enhance image compression efficiency.

Yet still another object of the present invention is to an intra prediction mode decoding method and apparatus that may enhance image compression efficiency.

Technical Solution

An aspect of the present invention is an image decoding method. The method includes the steps of deriving an MPM candidate mode from a neighboring block adjacent to a block to be decoded, generating an MPM list using the MPM candidate mode derived from the neighboring block, and deriving an intra prediction mode of the block to be decoded using the generated MPM list, wherein the number of MPM candidate modes included in the MPM list is a predetermined fixed number.

In a case where the prediction mode of the neighboring block is not included in prediction modes that may be owned by the block to be decoded, the step of deriving the MPM candidate mode from the neighboring block adjacent to the block to be decoded may include the steps of changing the prediction mode of the neighboring block into a final prediction mode and selecting the final prediction mode as the MPM candidate mode, wherein the final prediction mode is one of the prediction modes that may be owned by the block to be decoded.

The final prediction mode may be a non-directional mode.

The final prediction mode may be a prediction mode whose mode value is 0.

The final prediction mode may be derived by a predetermined fixed calculation method.

A mode value of the prediction mode derived by the predetermined fixed calculation method may be a remainder obtained by dividing the mode value of the prediction mode for the neighboring block by the number of the prediction modes that may be owned by the block to be decoded.

The final prediction mode may be a prediction mode having a highest frequency of occurrence among the prediction modes that may be owned by the block to be decoded, and the frequency of occurrence is proportional to the number of times of occurrence of a prediction mode accumulated in a current decoding process.

The step of generating the MPM list using the MPM candidate mode derived from the neighboring block may include the steps of obtaining an additional MPM candidate mode using an intra prediction mode except for the MPM candidate mode derived from the neighboring block and assigning the obtained additional MPM candidate mode to the MPM list.

The additional MPM candidate mode may be a non-directional mode.

The additional MPM candidate mode may be a directional prediction mode having a prediction direction most similar to a prediction direction of the MPM candidate mode derived from the neighboring block.

The additional MPM candidate mode may be a prediction mode having a highest frequency of occurrence among intra prediction modes except for the MPM candidate mode derived from the neighboring block, and wherein the frequency of occurrence is proportional to the number of times of occurrence of the intra prediction modes accumulated in a current decoding process.

Another aspect of the present invention is an image decoding apparatus includes an entropy decoding unit that entropy-decodes an MPM flag transmitted from an encoding unit and an intra prediction unit that derives an MPM candidate mode from a neighboring block adjacent to a block to be decoded, generates an MPM list using the MPM candidate mode derived from the neighboring block, derives an intra prediction mode of the block to be decoded using the generated MPM list and the entropy-decoded MPM flag, and performs intra prediction on the block to be decoded using the derived intra prediction mode, wherein the number of MPM candidate modes included in the MPM list is a predetermined fixed number.

Still another aspect of the present invention is an intra prediction mode decoding method. The method may include the steps of deriving an MPM candidate mode from a neighboring block adjacent to a block to be decoded, generating an MPM list using the MPM candidate mode derived from the neighboring block, and deriving an intra prediction mode of the block to be decoded using the generated MPM list, wherein the number of MPM candidate modes included in the MPM list is a predetermined fixed number.

In a case where the prediction mode of the neighboring block is not included in prediction modes that may be owned by the block to be decoded, the step of deriving the MPM candidate mode from the neighboring block adjacent to the block to be decoded may include the steps of changing the prediction mode of the neighboring block into a final prediction mode and selecting the final prediction mode as the MPM candidate mode, wherein the final prediction mode is one of the prediction modes that may be owned by the block to be decoded.

The step of generating the MPM list using the MPM candidate mode derived from the neighboring block may include the steps of obtaining an additional MPM candidate mode using an intra prediction mode except for the MPM candidate mode derived from the neighboring block and assigning the obtained additional MPM candidate mode to the MPM list.

Advantageous Effects

An image encoding method and apparatus according to the present invention may enhance image compression efficiency.

An image decoding method and apparatus according to the present invention may enhance image compression efficiency.

An intra prediction mode encoding method and apparatus according to the present invention may enhance image compression efficiency.

An intra prediction mode decoding method and apparatus according to the present invention may enhance image compression efficiency.

BEST MODE

Hereinafter, embodiments of the present invention will be described in detail with reference to the drawings. In describing the embodiments of the invention, when determined to make the gist of the invention unclear, the specific description of the relevant known configuration or functions will be omitted.

When an element is "connected to" or "coupled to" another element, the element may be directly connected or coupled to the other element, but other elements may also be present therebetween. Further, "including" a specific configuration does not exclude other configurations, and rather an additional configuration may be included in the embodiments or the scope of the invention.

The terms, such as "first" and "second", may be used to describe various components, but the components should not be limited to the terms. The terms are used only to distinguish one element from another. For example, a first component may be named a second component without departing from the scope of the invention, and similarly, the second component may be also named the first component.

The components in the embodiments of the invention are independently illustrated to represent different features from each other, and it does not mean that each component is not composed of separate hardware or one software component unit. That is, the components are separated from each other for convenience of description, and at least two components may be combined into a single component or one component may be split into plural components which then may perform respective functions. The combined or split components are also included in the scope of the invention without departing from the gist of the invention.

Further, some components are not inevitable components that perform essential functions of the invention but may be optional components for merely enhancing performance. The present invention may be implemented as including only the components necessary for implementing the gist of the invention except for components used for merely enhancing performance, and any configuration including only the necessary components except for the optional components used for merely enhancing performance is also included in the scope of the invention.

Figure 1:
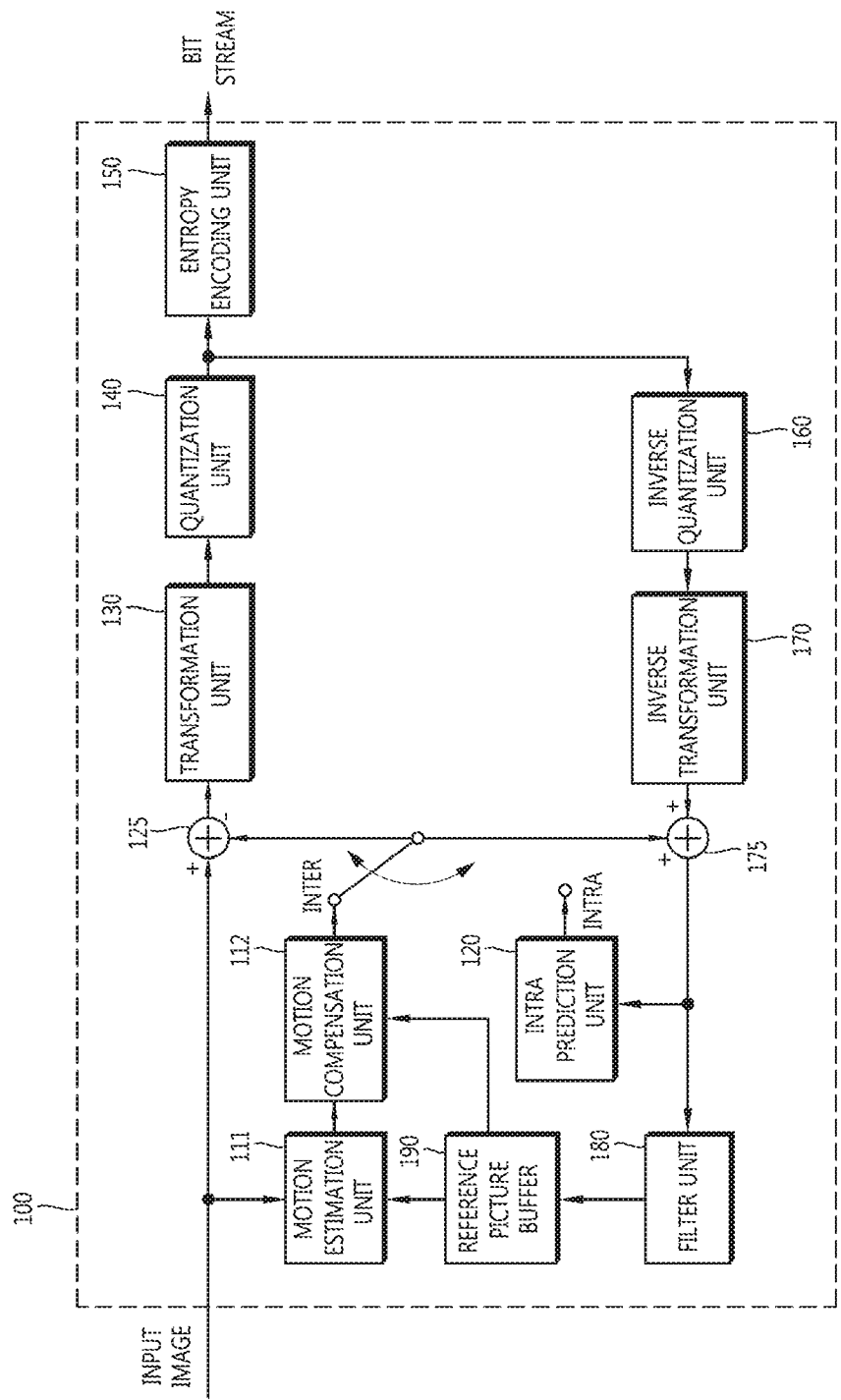
FIG. 1 is a block diagram illustrating a configuration of an image encoding apparatus according to an embodiment of the present invention.

FIG. 1 is a block diagram illustrating a configuration of an image encoding apparatus according to an embodiment of the present invention.

Referring to FIG. 1, the image encoding apparatus 100 includes a motion estimation unit 111, a motion compensation unit 112, an intra prediction unit 120, a switch 115, a subtracter 125, a transformation unit 130, a quantization unit 140, an entropy encoding unit 150, an inverse quantization unit 160, an inverse transformation unit 170, an adder 175, a filter unit 180, and a reference picture buffer 190.

The image encoding apparatus 100 may perform encoding on an input image in an intra mode or inter mode and may output a bit stream. The intra prediction means intra-frame prediction, and the inter prediction means inter-frame prediction. In case of the intra mode, the switch 115 may switch to "intra", and in case of the inter mode, the switch 115 may switch to "inter". The image encoding apparatus 100 may generate a prediction block for an input block of the input image and then may encode a residual between the input block and the prediction block.

In case of intra mode, the intra prediction unit 120 may generate a prediction block by performing spatial prediction using a pixel value of an already encoded block adjacent to a current block.

In case of inter mode, the motion estimation unit 111 may obtain a motion vector by finding a reason that best matches the input block in a reference image that is stored in the reference picture buffer 190 in the course of motion estimation. The motion compensation unit 112 may generate the prediction block by performing motion compensation using the motion vector.

The subtracter 125 may generate a residual block by the residue between the prediction block generated and the input block. The transformation unit 130 may perform transform on the residual block to output a transform coefficient. The quantization unit 140 may quantize the input transform coefficient according to a quantization parameter to output a quantized coefficient.

The entropy encoding unit 150 may perform entropy encoding based on the encoding parameter value obtained in the course of encoding or values obtained by the quantization unit 140 to thereby output a bit stream.

Upon application of entropy encoding, symbols are represented so that a smaller number of bits are assigned to a symbol more likely to be generated, and a larger number of bits are assigned to a symbol less likely to be generated, and thus, the size of bit stream for symbols to be encoded may decrease. Accordingly, compression performance of image encoding may be increased by entropy encoding. The entropy encoding unit 150 may use an encoding scheme, such as exponential golomb, CAVLC(Context-Adaptive Variable Length Coding), CABAC(Context-Adaptive Binary Arithmetic Coding), in order to perform entropy encoding.

Since the image encoding apparatus according to an embodiment illustrated in FIG. 1 performs inter prediction encoding, i.e., inter-frame prediction encoding, the currently encoded image needs to be encoded and stored to be used as a reference image. Accordingly, the quantized coefficient is inverse-quantized in the inverse quantization unit 160 and inverse-transformed in the inverse transformation unit 170. The inverse-quantized, inverse-transformed coefficient is added to the prediction block by the adder 175 so that a reconstructed block is generated.

The reconstructed block passes through the filter unit 180, and the filter unit 180 may apply at least one or more of a de-blocking filter, an SAO (Sample Adaptive Offset), and an ALF (Adaptive Loop Filter) to the reconstructed block or reconstructed picture. The filter unit 180 may be also called adaptive in-loop filter. The de-blocking filter may remove a block distortion that is created at a boundary between blocks. The SAO may add a proper offset value to a pixel value so as to compensate for a coding error. The ALF may perform filtering based on a value obtained by comparing the reconstructed image with the original image, and only when high efficiency applies, such filtering may be performed as well. Passing through the filter unit 180, the reconstructed block may be stored in the reference picture buffer 190.

Figure 2:
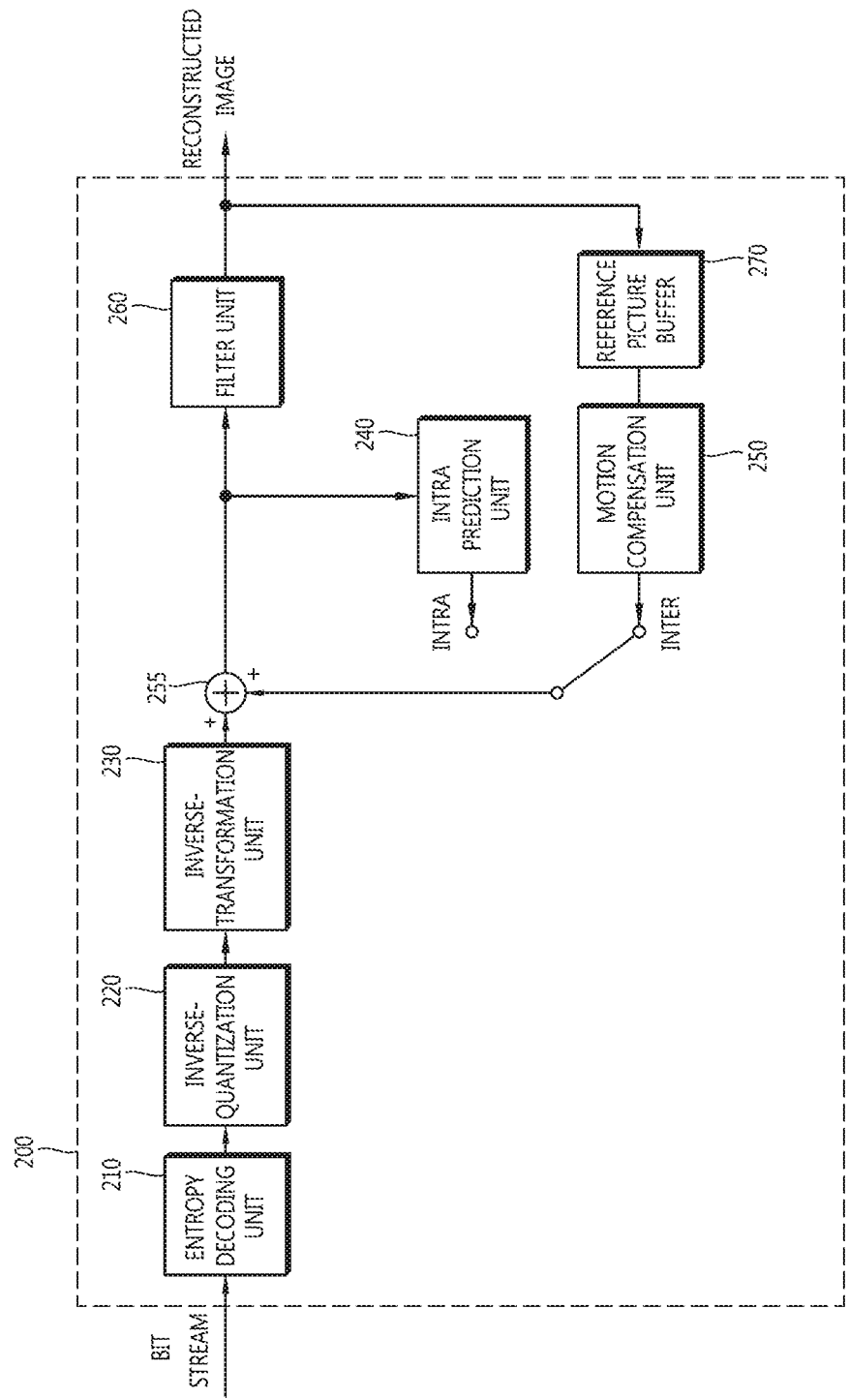
FIG. 2 is a block diagram illustrating a configuration an image decoding apparatus according to an embodiment of the present invention.

FIG. 2 is a block diagram illustrating a configuration an image decoding apparatus according to an embodiment of the present invention.

Referring to FIG. 2, the image decoding apparatus 200 includes an entropy decoding unit 210, an inverse-quantization unit 220, an inverse-transformation unit 230, an intra prediction unit 240, a motion compensation unit 250, an adder 255, a filter unit 260, and a reference picture buffer 270.

The image decoding apparatus 200 may receive the bit stream output from the encoding unit, perform decoding in an intra mode or inter mode, and output a reconfigured image, i.e., reconstructed image. In case of intra mode, the switch may switch to "intra", and in case of inter mode, the switch may switch to "inter". The image decoding apparatus 200 may obtain a residual block from the received bit stream, generate a prediction block, and add the residual block and the prediction block, thereby generating a reconfigured block, i.e., reconstructed block.

The entropy decoding unit 210 may entropy-decode the input bit stream according to a probability distribution to thereby generate symbols including symbols which are of a quantized-coefficient type. The entropy-decoding method is similar to the entropy-encoding method.

In case of applying the entropy-decoding method, the symbols are represented so that a smaller number of bits are assigned to a symbol more likely to be generated, and a larger number of bits are assigned to a symbol less likely to be generated, thereby resulting in a decrease in the size of the bit stream for the symbols. Accordingly, image decoding compression performance may be increased by the entropy decoding method.

The quantized coefficient is inverse-quantized by the inverse-quantization unit 220 and inverse-transformed by the inverse-transformation unit 230. As a result of the quantized coefficient being inverse-quantized and inverse-transformed, a residual block may be generated.

In case of an intra mode, the intra prediction unit 240 may generate a prediction block by performing spatial prediction using a pixel value of an already encoded block adjacent to the current block. In case of an inter mode, the motion compensation unit 250 may generate a prediction block by performing motion compensation using a reference image that is stored in the reference picture buffer 270 and the motion vector.

The residual block and the prediction block are added to each other by the adder 255, and the added blocks may get through the filter unit 260. The filter unit 260 may apply at least one or more of a de-blocking filter, an SAO, and an ALF to the reconstructed block or reconstructed picture. The filter unit 260 may output a reconfigured image, i.e., reconstructed image. The reconstructed image may be stored in the reference picture buffer 270 and used for inter prediction.

Hereinafter, the block means a unit of image encoding and decoding. Upon image encoding and decoding, a unit of encoding or decoding means a unit split when an image is split and encoded or decoded, and thus, it may be referred to as a coding unit (CU), a prediction unit (PU), a transform unit (TU), or a transform block. One block may be subdivided into subblocks having a smaller size.

The intra prediction may be performed according to an intra prediction mode of the block to be encoded/decoded. The number of intra prediction modes that may be owned by the block to be encoded/decoded may be fixed, and examples of the fixed number may be 4, 18, and 35. The following table 1 shows examples of the number of intra prediction modes that may be owned by the block to be encoded/decoded according to the size of the block to be encoded/decoded.

TABLE 1

| Block size | No. of modes |
| --- | --- |
| 4 × 4 | 18 |
| 8 × 8 | 35 |
| 16 × 16 | 35 |
| 32 × 32 | 35 |
| 64 × 64 | 4 |

The encoding unit may encode the intra prediction mode and transmit the encoded intra prediction mode to the decoding unit. When encoding the intra prediction mode for a block to be encoded and transmitting the encoded intra prediction mode, the encoding unit may use a method of predicting an intra prediction mode so as to increase encoding efficiency while decreasing the bits to be transmitted.

Since the prediction mode of the block to be encoded has a high chance of being the same as the prediction mode of a neighboring block, the encoding unit may encode the prediction mode of the block to be encoded by using the prediction modes of blocks adjacent to the block to be encoded. Hereinafter, prediction modes used as prediction values for intra prediction mode of the block to be encoded are referred to as MPMs (Most Probable Modes). Hereinafter, the neighboring blocks mean blocks adjacent to the current block.

Figure 3:
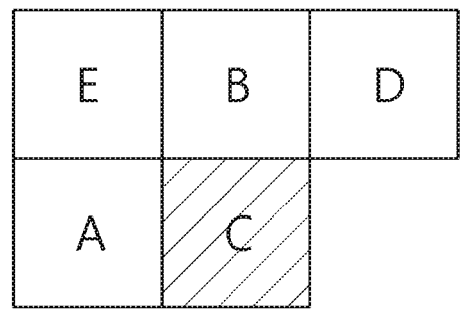
FIG. 3 is a conceptual view schematically illustrating neighboring blocks used to derive an MPM candidate mode according to an embodiment of the present invention.
Figure 4:
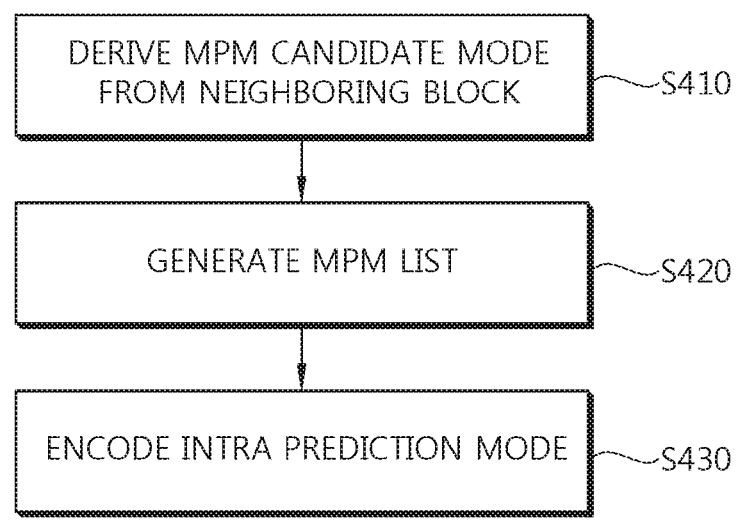
FIG. 4 is a flowchart schematically illustrating an intra prediction mode encoding method according to an embodiment of the present invention.

FIG. 3 is a conceptual view schematically illustrating neighboring blocks used to derive an MPM candidate mode according to an embodiment of the present invention. Referring to FIG. 3, the encoding unit and/or decoding unit may use at least one or more of prediction modes of blocks A, B, D, and E so as to derive an MPM candidate mode used for intra mode encoding of block C to be encoded. Hereinafter, in the following embodiments, the encoding unit and/or decoding unit are assumed to a prediction mode of the left neighboring block A and a prediction mode of an upper neighboring block B to derive the MPM candidate mode. For example, to encode the intra prediction mode of the block to be encoded, the encoding unit and/or decoding unit may select the prediction modes of the blocks A and B as MPM candidate modes. FIG. 4 is a flowchart schematically illustrating an intra prediction mode encoding method according to an embodiment of the present invention.

Referring to FIG. 4, the encoding unit may derive an MPM candidate mode from neighboring blocks adjacent to a block to be encoded (S410). The encoding unit may select a prediction mode of a neighboring block, as is, as an MPM candidate mode or may vary the prediction mode of the neighboring block and then select the varied final prediction mode as the MPM candidate mode. A specific embodiment of a method of deriving an MPM candidate mode using prediction modes of neighboring blocks will be described later with reference to FIG. 5.

The encoding unit may generate an MPM list using derived MPM candidate modes (S420). At this time, the encoding unit may assign MPM candidate modes derived from neighboring blocks to the MPM list.

For example, in the case that the prediction mode of a left neighboring block and the prediction mode of an upper neighboring block are, as is, selected as MPM candidate modes, the number of MPM candidate modes included in the MPM list may be 1 or 2. At this time, in the case that the prediction mode of the left neighboring block and the prediction mode of the upper neighboring block are the same as each other, the number of MPM candidate modes included in the MPM list may be 1, and in the case that the prediction mode of the left neighboring block is different from the prediction mode of the upper neighboring block, the number of MPM candidate modes included in the MPM list may be 2.

The encoding unit may use a predetermined fixed number of MPM candidate modes in order to encode the intra prediction mode. At this time, the number of MPM candidate modes included in the MPM list may be the same as the predetermined fixed number. The predetermined fixed number may be 1 or more, for example, 2, 3, or 4.

In an embodiment, in the case that the MPM candidate modes are derived using the prediction mode of the left neighboring block and the prediction mode of the upper neighboring block, the MPM candidate modes included in the MPM list may be fixed as 2. For example, the two MPM candidate modes, respectively, may be assigned to list[0] and list[1]. At this time, as an example, among the MPM candidate modes, the smaller mode may be assigned to list[0], and the larger mode may be assigned to list[1]. Here, 'list' may refer to the MPM list, list[0] to the first entry of the MPM list, and list[1] to the second entry of the MPM list.

In the case that a predetermined fixed number of MPM candidate modes are used for intra prediction, the number of the MPM candidate modes derived from the neighboring blocks may be smaller than the predetermined fixed number. In this case, there may be additional MPM candidate modes to be included in the MPM list. For example, it is assumed that the number of the MPM candidate modes in the MPM list is fixed as 2, and the encoding unit derives the MPM candidate modes using the prediction mode of the upper neighboring block and the prediction mode of the left neighboring block. In the case that the MPM candidate mode derived from the prediction mode of the left neighboring block is the same as the MPM candidate mode derived from the prediction mode of the upper neighboring block, the number of MPM candidate modes derived from the neighboring blocks may be 1. Since the number of the MPM candidate modes is fixed as 2, an additional MPM candidate mode may be needed to obtain a remaining entry included in the MPM list.

The additional MPM candidate mode may be selected among intra prediction modes except form the MPM candidate modes derived from the neighboring blocks.

In an embodiment of a method of deriving the additional MPM candidate mode, the encoding unit may select a predetermined fixed specific prediction mode as an additional MPM candidate mode. For example, in the case that the number of the MPM candidate modes in the MPM list is fixed as 2, and two MPM candidate modes derived from the neighboring blocks are the same as each other, the encoding unit may select a DC mode or planar mode, which is a non-directional mode, as the additional MPM candidate mode and may assign it to the MPM list.

In another embodiment of a method of deriving the additional MPM candidate mode, the encoding unit may select as the MPM candidate mode a directional prediction mode having a prediction direction most similar to a prediction mode of the MPM candidate mode derived from the neighboring block.

For example, in the case that the MPM candidate mode derived from the neighboring block is a vertical mode, the encoding unit may select a vertical−1 mode and/or a vertical+1 mode, which are prediction modes having a prediction direction most similar to a prediction direction of the mode, as additional MPM candidate modes and may assign them to the MPM list. At this time, in an embodiment, the mode value of the vertical mode may be 1, the mode value of vertical−1 mode may be 22, and the mode value of vertcal+1 mode may be 23.

In another embodiment of a method of deriving the additional MPM candidate mode, the encoding unit may select a prediction mode most frequently appearing as an additional MPM candidate mode.

For example, in the course of encoding, the encoding unit may accumulate the number of times of occurrence of each prediction mode, which may be owned by the block to be encoded. The accumulated number of times may indicate the frequency of occurrence, and the encoding unit may select a prediction mode having the highest frequency of occurrence as the additional MPM candidate mode and may assign it to the MPM list.

The encoding unit may accumulate the number of times of occurrence of the prediction mode on a per-slice basis and/or on a per-entropy slice basis. At this time, the degree of accumulation on a per-slice basis and/or on a per-entropy slice basis may vary, and the encoding unit may adaptively select the prediction mode having a high frequency of occurrence as an additional MPM candidate mode.

According to the above-described method, since the encoding unit may select the additional MPM candidate mode without using a separate table, no separate storage space is required, and complexity of operation may be reduced. Further, the encoding unit may adaptively select the additional MPM candidate mode according to the frequency of occurrence of the intra prediction mode, and thus, image compression efficiency may be enhanced.

Referring back to FIG. 4, the encoding unit may encode the intra prediction mode using the generated MPM list (S430).

The encoding unit may determine whether there is an MPM candidate mode that is the same as the prediction mode of the block to be encoded in the MPM list. The encoding unit may transmit to the decoding unit a flag indicating whether there is an MPM candidate mode the same as the prediction mode of the block to be encoded in the MPM list. Hereinafter, the flag is referred to as an MPM flag.

In an embodiment, the MPM flag transmitted to the decoding unit may be represented as prev_intra_luma_pred_flag. For example, if there is an MPM candidate mode the same as the prediction mode of the block to be encoded in the MPM list, 1 may be assigned to the MPM flag, and otherwise, 0 may be assigned to the MPM flag.

If there is an MPM candidate mode the same as the prediction mode of the block to be encoded in the MPM list, the encoding unit may transmit to the decoding unit an index indicating which MPM candidate mode among the MPM candidate modes in the MPM list is the same as the prediction mode of the block to be encoded. Hereinafter, the index may be referred to as an "MPM index". In an embodiment, the MPM index may be represented as mpm_idx.

If there is no MPM candidate mode the same as the prediction mode of the block to be encoded in the MPM list, the encoding unit may derive a remaining mode by using the MPM list and the prediction mode of the current block to be encoded. The encoding unit may encode the generated remaining mode and transmit the encoded remaining mode to the decoding unit. In an embodiment, the remaining mode may be represented as rem_intra_luma_pred_mode.

Figure 5:
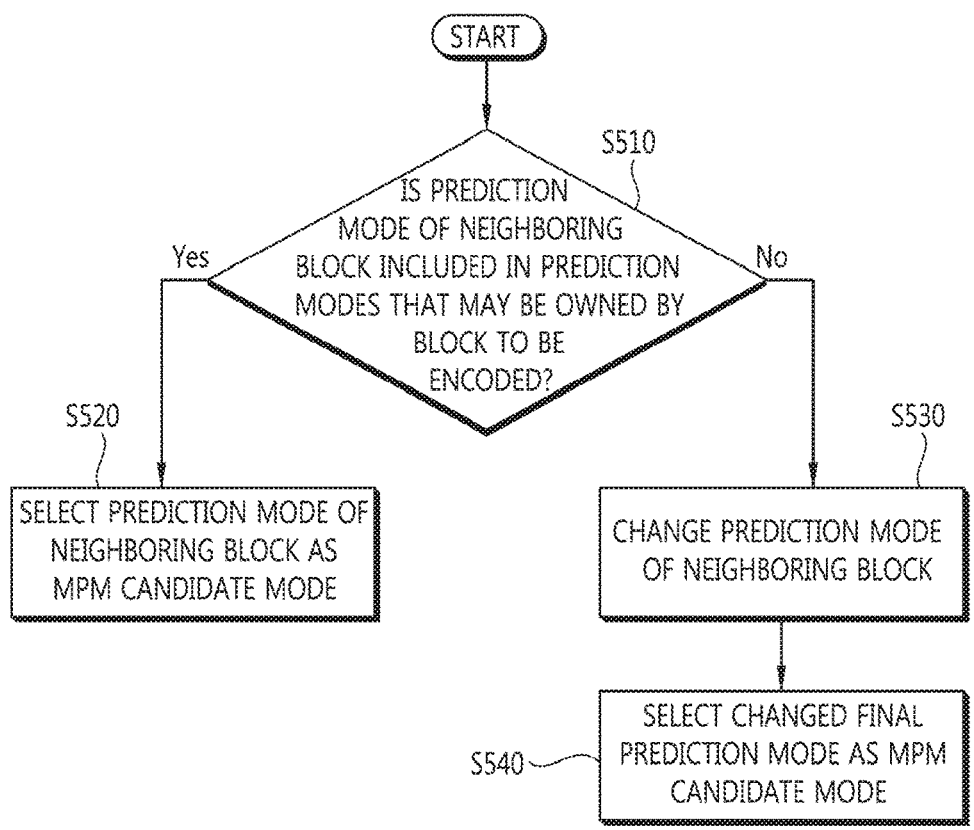
FIG. 5 is a flowchart schematically illustrating a method of deriving an MPM candidate mode using a prediction mode of a neighboring block of a block to be encoded according to an embodiment of the present invention.

FIG. 5 is a flowchart schematically illustrating a method of deriving an MPM candidate mode using a prediction mode of a neighboring block of a block to be encoded according to an embodiment of the present invention.

Referring to FIG. 5, the encoding unit may determine whether a prediction mode of a neighboring block is included in the prediction mode that may be owned by the block to be encoded (S510).

As described above in connection with table 1, the number of the intra prediction modes that may be owned by the current block to be encoded may be a predetermined fixed value. At this time, the prediction mode of the neighboring block may not be included in the prediction mode that may be owned by the block to be encoded.

Figure 6:
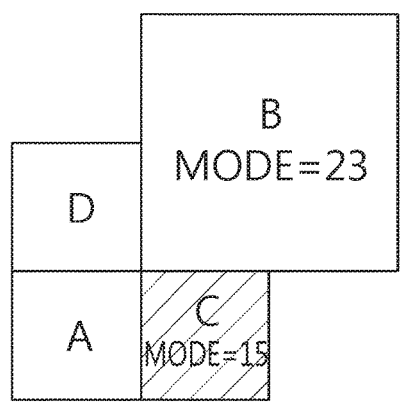
FIG. 6 is a conceptual view schematically illustrating an example where a prediction mode of a neighboring block is not included in the prediction modes that may be owned by the block to be encoded according to an embodiment of the present invention.

FIG. 6 is a conceptual view schematically illustrating an example where a prediction mode of a neighboring block is not included in the prediction modes that may be owned by the block to be encoded according to an embodiment of the present invention. In the embodiment illustrated in FIG. 6, it is assumed that the block C to be encoded has a size of 4×4, an upper neighboring block B has a size of 8×8, and the prediction mode of the block to be encoded is 15 and the prediction mode of the upper neighboring block is 23.

Since the size of the block to be encoded is 4×4, in reference to the embodiment described in connection with table 1, the block to be encoded may have one of 18 prediction modes (0 to 17). The prediction mode value of the upper neighboring block B is 23, and the maximum mode value of the current block to be encoded is 17, and thus, the prediction mode of the neighboring block may not be included in the prediction modes that may be owned by the current block to be encoded.

Referring back to FIG. 5, in the case that the prediction mode of the neighboring block is included in the prediction modes that may be owned by the block to be encoded, the encoding unit may select the prediction mode of the neighboring block, as is, as the MPM candidate mode (S520).

In the case that the prediction mode of the neighboring block is not included in the prediction modes that may be owned by the block to be encoded, the encoding unit may change the prediction mode of the neighboring block to derive an MPM candidate mode (S530). At this time, the encoding unit may change the prediction mode of the neighboring block as one of the intra prediction modes that may be owned by the current block to be encoded.

For example, in the embodiment illustrated in FIG. 6, the block C to be encoded may have prediction modes 0 to 17. Accordingly, the encoding unit may change the prediction mode 23 of the upper neighboring block B to one of the prediction modes 0 to 17 to derive the MPM candidate mode.

The change of the prediction mode of the neighboring block may be performed by various methods. Hereinafter, embodiments of methods of changing the prediction mode of the neighboring block will be described.

In an embodiment, in the case that the prediction mode of the neighboring block is not included in the prediction modes that may be owned by the block to be encoded, the encoding unit may change the prediction mode of the neighboring block into a non-directional mode. The non-directional prediction mode may include a DC mode or a planar mode. For example, the process in which the prediction mode of the neighboring block changes to the planar mode may be represented as follows:

If intraPredModeN is equal to or larger than intraPredModeNum,
candIntraPredModeN = Intra_Planar
If intraPredModeN is smaller than intraPredModeNum,
candIntraPredModeN = intraPredModeN Here, intraPredModeN may refer to an intra prediction mode of a neighboring block. For example, in the embodiment illustrated in FIG. 3, when N is A, intraPredModeN may represent a prediction mode of the upper neighboring block. intraPredModeNum may represent the number of intra prediction modes that may be owned by the block to be encoded. For example, the number of the intra prediction modes may be set as in the embodiment described in table 1 according to the size of the block to be encoded. candIntraPredModeN may represent the final prediction mode of the changed neighboring block.

In another embodiment, in the case that the prediction mode of the neighboring block is not included in the prediction modes that may be owned by the block to be encoded, the encoding unit may change the prediction mode of the neighboring block into a prediction mode whose mode value is 0. Since an order of the intra prediction modes is generally set based on the frequency of occurrence, the frequency of occurrence of a prediction mode having a mode value 0 has a higher chance of being larger than the frequency of occurrence of other prediction modes. Accordingly, since the prediction mode of the current block to be encoded has a high chance of being a prediction mode whose mode value is 0, the encoding unit may enhance encoding efficiency by changing the prediction mode of the neighboring block into a prediction mode whose mode value is 0.

In another embodiment, in the case that the prediction mode of the neighboring block is not included in the prediction modes that may be owned by the block to be encoded, the encoding unit may change the prediction mode of the neighboring block into a prediction mode calculated by a predetermined calculation method.

For example, the predetermined calculation method may be a method of obtaining a remainder that is obtained by dividing the prediction mode of the neighboring block by the number of the intra prediction modes that may be owned by the block to be encoded and/or the maximum prediction mode value that may be owned by the block to be encoded. That is, the final prediction mode value of the changed neighboring block may be a remainder obtained by dividing the prediction mode of the neighboring block by the number of the intra prediction modes that may be owned by the block to be encoded and/or the maximum prediction mode value that may be owned by the block to be encoded. A process of changing the prediction mode of the neighboring block using the predetermined calculation method may be represented as follows:

If intraPredModeN is equal to or larger than intraPredModeNum,

```
>> if intraPredModeNum is 4,
candIntraPredModeN = mod(intraPredModeN, 4)
>> unless intraPredModeNum is 4,
candIntraPredModeN = mod(intraPredModeN, 18)
if intraPredModeN is smaller than intraPredModeNum,
candIntraPredModeN = intraPredModeN
```

Here, mod(X, Y) may represent a remainder obtained by dividing X by Y.

In another embodiment, in the case that the prediction mode of the neighboring block is not included in the prediction modes that may be owned by the block to be encoded, the encoding unit may change the prediction mode of the neighboring block into the prediction mode having the highest frequency of occurrence among the prediction modes that may be owned by the block to be encoded.

For example, in the course of encoding, the encoding unit may accumulate the number of times of occurrence of each of the prediction modes that may be owned by the current block to be encoded. The accumulated number of times of occurrence may represent a frequency of occurrence, and in an embodiment, the frequency of occurrence may be proportional to the accumulated number of times of occurrence. The encoding unit may change the prediction mode of the neighboring block into the prediction mode having the highest frequency of occurrence.

The encoding unit may also accumulate the number of times of occurrence of each prediction mode on a per-slice basis and/or on a per-entropy slice basis. At this time, the degree accumulated on a per-slice basis and/or on a per-entropy slice basis may vary, and the encoding unit may adaptively change the prediction mode of the neighboring block into a prediction mode having a high frequency of occurrence. Referring back to FIG. 5, the encoding unit may select the changed final prediction mode as the MPM candidate mode (S540).

The above-described MPM candidate mode deriving method may derive the MPM candidate mode without using a separate table, thus eliminating the need of a separate storage and resulting in a decrease in operation complexity. Further, the encoding unit may adaptively derive the MPM candidate mode according to the frequency of occurrence of the intra prediction mode, and thus, image compression efficiency may be enhanced.

Figure 7:
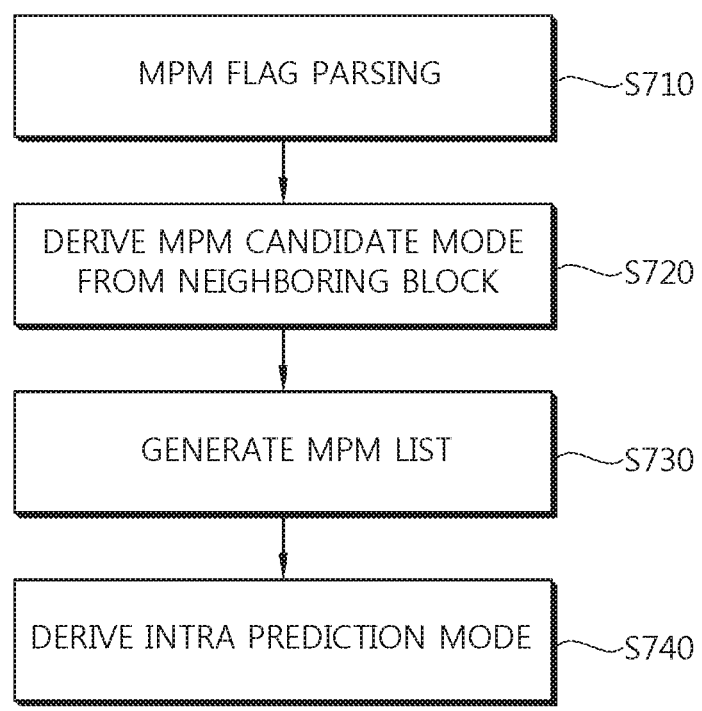
FIG. 7 is a flowchart schematically illustrating an intra prediction mode decoding method according to an embodiment of the present invention.

FIG. 7 is a flowchart schematically illustrating an intra prediction mode decoding method according to an embodiment of the present invention.

Referring to FIG. 7, the decoding unit may parse the MPM flag (S710). As described above, the MPM flag is a flag indicating whether the MPM list includes an MPM candidate mode the same as the prediction mode of the block to be encoded.

In an embodiment, the MPM flag may be represented as prev_intra_luma_pred_flag. For example, in the case that the MPM list includes an MPM candidate mode the same as the prediction mode of the block to be encoded, 1 may be assigned to the MPM flag, and otherwise, 0 may be assigned to the MPM flag.

The decoding unit may derive the MPM candidate mode from neighboring blocks adjacent to the block to be encoded (S720). The decoding unit may select the prediction mode of the neighboring block, as is, as the MPM candidate mode, or may change the prediction mode of the neighboring block and may select the changed final prediction mode as the MPM candidate mode. A specific embodiment of an MPM candidate mode deriving method using the prediction mode of the neighboring block will be described later with reference to FIG. 8

The decoding unit may generate the MPM list using the derived MPM candidate modes (S730). At this time, the decoding unit may assign the MPM candidate modes derived from the neighboring blocks to the MPM list. For example, in the case that the prediction mode of the left neighboring block and the prediction mode of the upper neighboring block are, as is, selected as the MPM candidate modes, the number of the MPM candidate modes included in the MPM list may be 1 or 2. At this time, in the case that the prediction mode of the left neighboring block is the same as the prediction mode of the upper neighboring block, the number of the MPM candidate modes included in the MPM list may be 1, or in the case that the prediction mode of the left neighboring block is different from the prediction mode of the upper neighboring block, the number of MPM candidate modes included in the MPM list may be 2.

The decoding unit may always use a predetermined fixed number of MPM candidate modes to encode intra prediction modes. At this time, the number of MPM candidate modes included in the MPM list may be the same as the predetermined fixed number. The predetermined fixed number may be 1 or more, for example, 2, 3, or 4.

In an embodiment, in the case that the MPM candidate modes are derived using the prediction mode of the left neighboring block and the prediction mode of the upper neighboring block, the number of the MPM candidate modes included in the MPM list may be fixed to 2. For example, two MPM candidate modes, respectively, may be assigned to list[0] and list[1]. At this time, as an example, the one having a smaller mode value among the MPM candidate modes may be assigned to list[0], and the one having a larger mode value among the MPM candidate modes may be assigned to list[1]. Here, list may refer to the MPM list, list[0] to a first entry in the MPM list, and list[1] to a second entry in the MPM list.

In the case that a predetermined fixed number of MPM candidate modes are used for intra prediction, the number of the MPM candidate modes derived from the neighboring blocks may be smaller than the predetermined fixed number. At this time, additional MPM candidate modes may be needed that are included in the MPM list.

For example, it is assumed that the number of the MPM candidate modes in the MPM list is fixed to 2, and the decoding unit derives the MPM candidate modes using the prediction mode of the upper neighboring block and the prediction mode of the left neighboring block. In the case that the MPM candidate mode derived from the prediction mode of the left neighboring block is the same as the MPM candidate mode derived from the prediction mode of the upper neighboring block, the number of the MPM candidate modes derived from the neighboring blocks may be 1. Since the number of the MPM candidate modes is fixed to 2, additional MPM candidate modes may be needed to obtain the remaining entry included in the MPM list.

The additional MPM candidate mode may be selected among the intra prediction modes except for the MPM candidate modes derived from the neighboring blocks. In an embodiment of a method of deriving the additional MPM candidate mode, the decoding unit may select a predetermined fixed specific prediction mode as the additional MPM candidate mode. For example, in the case that the number of the MPM candidate modes in the MPM list, and two MPM candidate modes derived from the neighboring blocks are the same as each other, the decoding unit may select a DC mode or planar mode, which is a non-directional mode, as the additional MPM candidate mode and may assign the selected MPM candidate mode to the MPM list. In another embodiment of a method of deriving the additional MPM candidate mode, the decoding unit may select as the additional MPM candidate mode a directional prediction mode having a prediction direction most similar to the prediction direction of the MPM candidate mode derived from the neighboring block.

For example, in the case that the MPM candidate mode derived from the upper neighboring block is a vertical mode, the decoding unit may select a vertical−1 mode and/or vertical+1 mode, which are directional prediction modes having a prediction direction most similar to a prediction direction of the mode, as the MPM candidate modes and may assign the selected MPM candidate modes to the MPM list. At this time, in an embodiment, the mode value of the vertical mode may be 1, the mode value of vertical−1 mode 22, and the mode value of vertical+1 23.

In still another embodiment of a method of deriving the additional MPM candidate mode, the decoding unit may select a prediction mode having the highest frequency of occurrence as the additional MPM candidate mode.

For example, in the course of decoding, the decoding unit may accumulate the number of times of occurrence of each prediction mode, which may be owned by the block to be decoded. The accumulated number of times may indicate the frequency of occurrence, and the decoding unit may select a prediction mode having the highest frequency of occurrence as the additional MPM candidate mode and may assign it to the MPM list.

The decoding unit may accumulate the number of times of occurrence of the prediction mode on a per-slice basis and/or on a per-entropy slice basis. At this time, the degree of accumulation on a per-slice basis and/or on a per-entropy slice basis may vary, and the decoding unit may adaptively select the prediction mode having a high frequency of occurrence as an additional MPM candidate mode.

According to the above-described method, since the decoding unit may select the additional MPM candidate mode without using a separate table, no separate storage space is required, and complexity of operation may be reduced. Further, the decoding unit may adaptively select the additional MPM candidate mode according to the frequency of occurrence of the intra prediction mode, and thus, image compression efficiency may be enhanced.

Referring back to FIG. 7, the decoding unit may derive the intra prediction mode (S740).

The decoding unit may determine through a parsed MPM flag whether there is an MPM candidate mode the same as the prediction mode of the block to be decoded in the MPM list. As described above, in an embodiment, the MPM flag may be represented as prev_intra_luma_pred_flag.

In the case that the MPM flag is 0, that is, in the case that there is no MPM candidate mode that is the same as the prediction mode of the block to be decoded in the MPM list, the decoding unit may parse a remaining mode from the bit stream received from the encoding unit. In an embodiment, the remaining mode may be represented as rem_intra_luma_pred_mode. The decoding unit may derive the intra prediction mode of the current block to be decoded using the MPM list and the remaining mode.

In the case that the MPM flag is 1, that is, in the case that there is an MPM candidate mode that is the same as the prediction mode of the block to be decoded in the MPM list, the decoding unit may parse the MPM index from the bit stream received from the encoding unit. Hte MPM index is an index indicating an MPM candidate mode among MPM candidate modes in the MPM list, which is the same as the prediction mode of the block to be decoded. In an embodiment, the MPM index may be represented as mpm_idx. The decoding unit may derive the intra prediction mode of the current block to be decoded using the MPM list and the MPM index.

For example, in the case that two MPM candidate modes are in the MPM list, the MPM index may indicate whether the prediction mode of the block to be decoded is identical to the MPM candidate mode of list[0] or the MPM candidate mode of list[1]. At this time, the decoding unit may determine the MPM candidate mode indicated by the MPM index as the intra prediction mode of the current block to be decoded.

Figure 8:
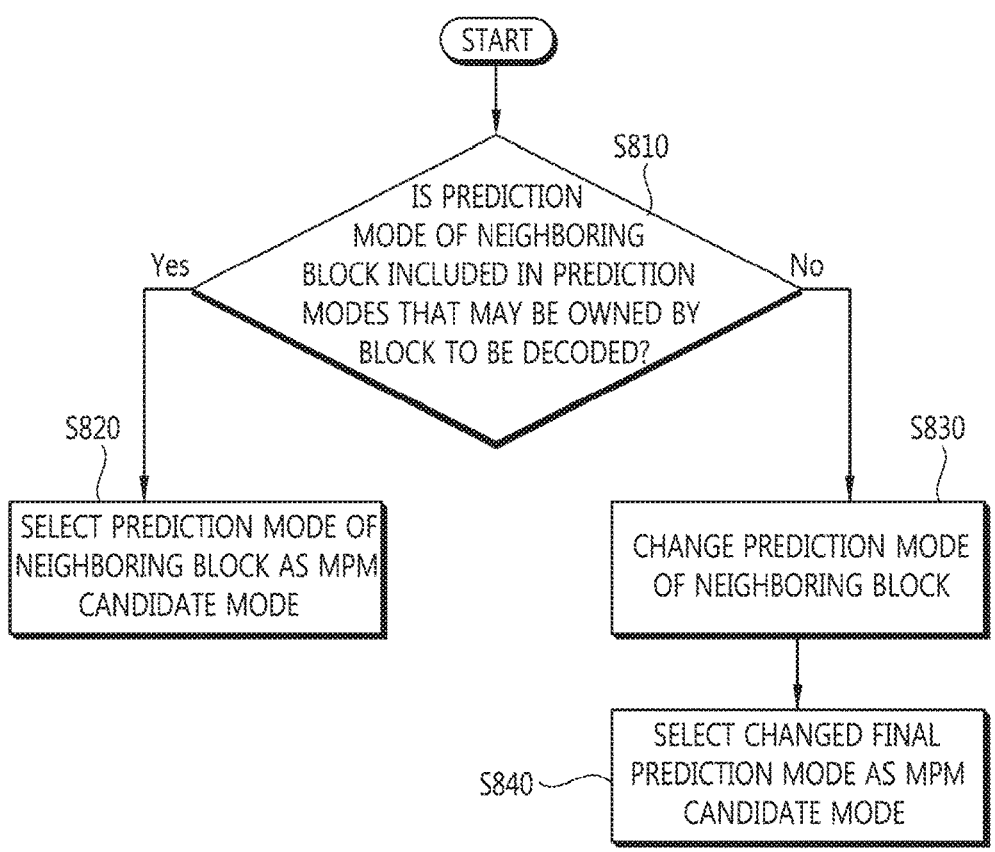
FIG. 8 is a flowchart schematically illustrating a method of deriving an MPM candidate mode using a prediction mode of a neighboring block for a block to be decoded according to an embodiment of the present invention.

FIG. 8 is a flowchart schematically illustrating a method of deriving an MPM candidate mode using a prediction mode of a neighboring block for a block to be decoded according to an embodiment of the present invention.

Referring to FIG. 8, the decoding unit may determine whether the prediction mode of the neighboring block is included in the prediction modes that may be owned by the block to be decoded (S810).

As described above in connection with table 1, the number of intra prediction modes that may be owned by the current block to be decoded may be a predetermined fixed number. At this time, the prediction mode of the neighboring block may not be included in the prediction modes that may be owned by the block to be decoded. An embodiment where the prediction mode of the neighboring block is not included in the prediction modes that may be owned by the block to be decoded is similar to the embodiment described in connection with FIG. 6, and the detailed description will be omitted.

Referring back to FIG. 8, in the case that the prediction mode of the neighboring block is included in the prediction modes that may be owned by the block to be decoded, the decoding unit may select the prediction mode of the neighboring block, as is, as the MPM candidate mode (S820).

In the case that the prediction mode of the neighboring block is not included in the prediction modes that may be owned by the block to be decoded, the decoding unit may change the prediction mode of the neighboring block to derive the MPM candidate mode (S830). At this time, the decoding unit may change the prediction mode of the neighboring block into one of the intra prediction modes that may be owned by the current block to be decoded.

For example, when the number of the prediction modes that may be owned by the block to be decoded is 18, the prediction modes that may be owned by the block to be decoded may be 0 to 17. At this time, assuming that the prediction mode of the upper neighboring block is 23, the decoding unit may change the prediction mode of the upper neighboring block into one of the prediction modes 0 to 17.

Various methods may be used to change the prediction mode of the neighboring block. Hereinafter, embodiments of methods of changing the prediction mode of the neighboring block will be described.

In an embodiment, in the case that the prediction mode of the neighboring block is not included in the prediction modes that may be owned by the block to be decoded, the decoding unit may change the prediction mode of the neighboring block into a non-directional mode. The non-directional prediction mode may include a DC mode or a planar mode. For example, the process in which the prediction mode of the neighboring block changes to the planar mode may be represented as follows:

---

If intraPredModeN is equal to or larger than intraPredModeNum,
candIntraPredModeN = Intra_Planar
If intraPredModeN is smaller than intraPredModeNum,
candIntraPredModeN = intraPredModeN

---

Here, intraPredModeN may refer to an intra prediction mode of a neighboring block. For example, in the embodiment illustrated in FIG. 3, when N is A, intraPredModeN may represent a prediction mode of the upper neighboring block. intraPredModeNum may represent the number of intra prediction modes that may be owned by the block to be decoded. For example, the number of the intra prediction modes may be set as in the embodiment described in table 1 according to the size of the block to be decoded. candIntraPredModeN may represent the final prediction mode of the changed neighboring block.

In another embodiment, in the case that the prediction mode of the neighboring block is not included in the prediction modes that may be owned by the block to be decoded, the decoding unit may change the prediction mode of the neighboring block into a prediction mode whose mode value is 0. Since an order of the intra prediction modes is generally set based on the frequency of occurrence, the frequency of occurrence of a prediction mode having a mode value 0 has a higher chance of being larger than the frequency of occurrence of other prediction modes. Accordingly, since the prediction mode of the current block to be decoded has a high chance of being a prediction mode whose mode value is 0, the decoding unit may enhance encoding efficiency by changing the prediction mode of the neighboring block into a prediction mode whose mode value is 0.

In another embodiment, in the case that the prediction mode of the neighboring block is not included in the prediction modes that may be owned by the block to be decoded, the decoding unit may change the prediction mode of the neighboring block into a prediction mode calculated by a predetermined calculation method.

For example, the predetermined calculation method may be a method of obtaining a remainder that is obtained by dividing the prediction mode of the neighboring block by the number of the intra prediction modes that may be owned by the block to be decoded and/or the maximum prediction mode value that may be owned by the block to be decoded. That is, the final prediction mode value of the changed neighboring block may be a remainder obtained by dividing the prediction mode of the neighboring block by the number of the intra prediction modes that may be owned by the block to be decoded and/or the maximum prediction mode value that may be owned by the block to be decoded. A process of changing the prediction mode of the neighboring block using the predetermined calculation method may be represented as follows:

---

If intraPredModeN is equal to or larger than intraPredModeNum,
>> if intraPredModeNum is 4,
candIntraPredModeN = mod(intraPredModeN, 4)
>> unless intraPredModeNum is 4,
candIntraPredModeN = mod(intraPredModeN, 18)
if intraPredModeN is smaller than intraPredModeNum,
candIntraPredModeN = intraPredModeN

---

Here, mod(X, Y) may represent a remainder obtained by dividing X by Y.

In another embodiment, in the case that the prediction mode of the neighboring block is not included in the prediction modes that may be owned by the block to be decoded, the decoding unit may change the prediction mode of the neighboring block into the prediction mode having the highest frequency of occurrence among the prediction modes that may be owned by the block to be decoded.

For example, in the course of decoding, the decoding unit may accumulate the number of times of occurrence of each of the prediction modes that may be owned by the current block to be decoded. The accumulated number of times of occurrence may represent a frequency of occurrence, and in an embodiment, the frequency of occurrence may be proportional to the accumulated number of times of occurrence. The decoding unit may change the prediction mode of the neighboring block into the prediction mode having the highest frequency of occurrence.

The decoding unit may also accumulate the number of times of occurrence of each prediction mode on a per-slice basis and/or on a per-entropy slice basis. At this time, the degree accumulated on a per-slice basis and/or on a per-entropy slice basis may vary, and the decoding unit may adaptively change the prediction mode of the neighboring block into a prediction mode having a high frequency of occurrence. Referring back to FIG. 8, the decoding unit may select the changed final prediction mode as the MPM candidate mode (S840).

According to the method of deriving the MPM candidate mode, the MPM candidate mode may be derived without using a separate table, so that no separate storage space is required and operation complexity may be reduced. Further, the decoding unit may adaptively derive the MPM candidate mode according to the frequency of occurrence of the prediction mode, so that image compression efficiency may be enhanced.

Although the above embodiments have been described based on a series of steps or blocks or flowcharts, the present invention is not limited to the order of the steps, and rather some steps may occur concurrently with or in a different order from other steps. Further, it will be understood by those skilled in the art that some steps in the flowchart may be non-exclusively included in other steps, or one or more steps in the flowchart may be omitted without affecting the scope of the invention.

The above-described embodiments include various aspects of examples. Although it is not possible to describe all possible combinations to represent various aspects, it will be understood by those skilled in the art that other combinations may be available. Accordingly, the present invention is intended to include all other modifications, alterations, and variations that belong to the appended claims.

The invention claimed is:

1. A video decoding method with a decoding apparatus, comprising:
    obtaining, with the decoding apparatus, a residual block relating to a current block of a video frame to be decoded by entropy-decoding an input bitstream;
    obtaining, with the decoding apparatus, a first Most Probably Mode (MPM) candidate mode from at least one neighboring block adjacent to the current block;
    generating, with the decoding apparatus, a MPM list based on the first MPM candidate mode;
    deriving, with the decoding apparatus, an intra prediction mode of the current block from the generated MPM list;
    performing, with the decoding apparatus, intra prediction of the current block based on the derived intra prediction mode to generate a prediction block relating to the current block; and
    reconstructing, with the decoding apparatus, the current block by adding the residual block and the prediction block,
    wherein the MPM list comprises a second MPM candidate mode, the second MPM candidate mode being representative of a directional prediction mode, the directional prediction mode corresponding to a value resulting from either adding one to a value of the first MPM candidate mode or subtracting one from the value of the first MPM candidate mode.

2. The video decoding method of claim 1, wherein the intra prediction mode of the current block is derived based on a MPM flag, the MPM flag indicating whether the MPM list comprises a same MPM candidate mode as the intra prediction mode of the current block.

3. The video decoding method of claim 2, wherein in response to the MPM flag indicating that the MPM list comprises the same MPM candidate mode as the intra prediction mode of the current block, deriving, with the decoding apparatus, the intra prediction mode of the current block comprising:
    extracting, with the decoding apparatus, a MPM index from a bitstream, the MPM index being signaled to select one of the MPM candidate modes comprised in the MPM list; and
    determining, with the decoding apparatus, the intra prediction mode of the current block by using the MPM list and the MPM index.

4. The video decoding method of claim 2, wherein in response to the MPM flag indicating that the MPM list does not comprise the same MPM candidate mode as the intra prediction mode of the current block, deriving the intra prediction mode of the current block comprising:
    extracting, with the decoding apparatus, a remaining mode from a bitstream, the remaining mode being signaled to specify the intra prediction mode of the current block;
    reordering, with the decoding apparatus, the MPM candidate modes in ascending order based on a comparison of values of the MPM candidate modes in the MPM list; and
    deriving, with the decoding apparatus, the intra prediction mode of the current block by using the remaining mode and the reordered MPM list.

5. The video decoding method of claim 1, wherein the MPM list comprises a fixed number of MPM candidate modes.

6. The video decoding method of claim 5, wherein the fixed number of the MPM candidate modes is equal to or greater than 3.

* * * * *